United States Patent [19]
Harris

[11] Patent Number: 5,482,487
[45] Date of Patent: Jan. 9, 1996

[54] MOTIVATIONAL SAVINGS BANK SET INCLUDING TOKEN CURRENCY

[76] Inventor: William H. Harris, 10958 Poblado Rd. #3122, San Diego, Calif. 92127

[21] Appl. No.: 89,347

[22] Filed: Jul. 12, 1993

[51] Int. Cl.⁶ .............................. A45C 1/12; G09B 19/18; G09B 19/00
[52] U.S. Cl. .................. 446/8; 446/76; 434/107; 434/238
[58] Field of Search ................... 446/8, 9, 10, 11, 446/12, 13, 71, 75, 76, 491; 434/107, 110, 238; 273/243

[56] References Cited

U.S. PATENT DOCUMENTS

| | | | |
|---|---|---|---|
| D 160,133 | 9/1950 | Thompson | 446/8 X |
| D 245,362 | 8/1977 | Patsiner. | |
| D 276,093 | 10/1984 | Ryvarden. | |
| 3,143,285 | 8/1964 | Fulton | 446/8 X |
| 3,181,781 | 5/1965 | Randall et al. | 446/9 X |
| 3,313,477 | 4/1967 | Brown | 446/8 X |
| 3,696,992 | 10/1972 | Krone et al.. | |
| 3,721,385 | 3/1973 | Krone et al.. | |
| 4,068,797 | 1/1978 | Rudolf et al.. | |
| 4,775,321 | 10/1988 | Comeaux et al. | 434/110 |
| 4,976,622 | 12/1990 | Clark | 434/238 X |
| 5,071,132 | 12/1991 | Ward et al. | 273/243 |
| 5,092,776 | 3/1992 | Shanahan | 446/8 X |
| 5,257,940 | 11/1993 | Schaarschmidt | 434/238 X |

FOREIGN PATENT DOCUMENTS 2321677  4/1973  Germany .............. 434/110

Primary Examiner—Robert A. Hafer
Assistant Examiner—D. Neal Muir
Attorney, Agent, or Firm—Robert A. Shack; David L. Baker; Henry S. Miller

[57] ABSTRACT

A motivational savings bank set, the motivational savings bank set including a savings bank, the savings bank including a plurality of separate and discrete chambers, the chambers being of sequential, ordered, and ascending vertical heights, each of the chambers having indicia provided thereon, the indicia on the chambers indicating a plurality of sequential, ordered, and ascending levels of achievement corresponding to the sequential, ordered, and ascending vertical heights of the chambers, all but one of the chambers having an associated insertion slot and the shortest of the chambers lacking an insertion slot, and a plurality of tokens, each of the tokens bearing indicia thereon indicating a denomination, and the indicia on the tokens being of ascending denominations.

2 Claims, 7 Drawing Sheets

| NAME | GRADE | DATE | REMARKS |
|------|-------|------|---------|
| JOE | H A ⓑ C D F | 3/4/95 | $1.50 |
| SUE | Ⓗ Ⓐ B C D F | 3/4/95 | 2.00 |
| MARY | Ⓗ Ⓐ B C D F | 3/20/95 | 10.00 HONOR ROLL |
| | | | |
| | | | |
| | | | |
| | | | |
| | | | |
| | | | |
| | | | |
| | | | |
| | | | |
| | | | |
| | | | |
| | | | |
| | | | |

FIG. 8

MOTIVATIONAL SAVINGS BANK SET INCLUDING TOKEN CURRENCY

BACKGROUND

1. Field of the Invention

The present invention relates to the field of tabletop savings banks and to the field of motivational devices, particularly those directed toward children.

2. Description of the Related Art

U.S. Pat. No. 4,068,797 relates to a plastic savings bank that includes a cylindrical upper portion which mates with a generally circular base. Both the upper portion and the base are provided with inwardly projecting axial latching mechanisms that interlock with one another and are releasable by a key inserted into the base.

U.S. Pat. No. 3,721,385 discloses a savings bank having an insertion slot safety mechanism and a bolt lock operated by a key. The bolt lock is situated below the insertion slot safety mechanism and can be operated by means of a key introduced into the insertion slot.

U.S. Pat. No. 3,696,992 relates to a savings bank insertion slot safety mechanism that includes a number of plates that slide in a direction transverse to the insertion slot and are biased toward the center of the slot. The plates are forced sideways by the insertion of a coin and close toward the center of the slot following the coin's passage.

Finally, U.S. Design Pat. Nos. 245,362 and 276,093 disclose ornamental designs for tabletop savings banks.

SUMMARY OF THE INVENTION

The invention, which includes a savings bank of a particular construction, together with accompanying token currency, furnishes a convenient manner for a parent to reward a child for his or her achievements. The bank has a number of chambers of ascending vertical heights that provide a visual indication of the various levels of achievement. The different columns can be linked, for example, to the school grades received by the child. Token currency of selective denominations is awarded to the child based upon his or her performance, which is redeemable by the child at an agreed upon time. Special award cards can be used to indicate particularly superior achievement. The token currency and the special award cards are to be deposited into the various chambers of the bank. Preferably, the shortest column of the bank is not provided with a deposit slot.

In one aspect, the invention generally features a motivational savings bank set, the motivational savings bank set including: a savings bank, the savings bank including a plurality of separate and discrete chambers, the plurality of chambers being of differing vertical heights, each of the plurality of chambers having indicia provided thereon, the indicia on the chambers indicating differing levels of achievement corresponding to the differing vertical heights of the chambers; and a plurality of tokens, each of the tokens having indicia thereon indicating a denomination.

Preferably, the plurality of tokens having denominational indicia thereon includes imitation money of ascending denominations; the plurality of chambers are aligned substantially in a row in order of ascending height; all but the shortest of the plurality of chambers includes an associated insertion slot, and the shortest of the plurality of chambers lacks an insertion slot; the imitation money of ascending denominations includes at least two separate and distinct series of imitation money of ascending denominations; the at least two series of imitation money includes a first series of imitation paper money of ascending denominations and a series of imitation coin money or ascending denominations; the at least two series of imitation money includes a first series of imitation paper money and a second series of imitation paper money, the second series of imitation paper money being separate and distinct from the first series of imitation paper money; the at least two series of imitation money additionally includes a second series of imitation paper money of ascending denominations, the second series of imitation paper money being separate and distinct from the first series of imitation paper money; the plurality of chambers includes at least five chambers; the motivational savings bank set additionally includes a plurality of special award tokens, and the plurality of chambers additionally includes a sixth chamber, the sixth chamber being greater in height than any of the five chambers; the savings bank includes a container member, the plurality of chambers being unitarily formed with the container member, the plurality of chambers arranged in order of ascending height have top surfaces, the insertion slots being located on the top surfaces of the plurality of chambers, and the top surfaces of the plurality of chambers form an ascending staircase top surface of the container member; the container member has a plurality of chamber openings provided on the bottom thereof, and the motivational savings bank additionally includes a plurality of stopper members for closing the plurality of chamber openings; the motivational savings bank set additionally includes a tally sheet for maintaining a record of awards of the imitation money.

In another aspect, the invention generally features a motivational savings bank set, the motivational savings bank set including: a savings bank, the savings bank including: at least five separate and discrete chambers; the at least five chambers being of sequential, ordered, and ascending vertical heights; each of the at least five chambers having indicia provided thereon, the indicia on the chambers indicating five sequential, ordered, and ascending levels of achievement corresponding to the sequential, ordered, and ascending vertical heights of the at least five chambers; the four tallest of the at least five chambers having an associated insertion slot and the shortest of the five chambers lacking an insertion slot; and a plurality of tokens, each of the tokens bearing indicia thereon indicating a denomination, the indicia on the plurality of tokens being of ascending denominations.

Preferably, the at least five chambers are arranged substantially in a row, the chambers being ordered in the row according to their ascending vertical heights, and the plurality of tokens bearing indicia of ascending denominations includes imitation money of ascending denominations; the imitation money of ascending denominations includes a series of imitation bills of ascending denominations, and a series of imitation coins of ascending denominations; the savings bank additionally includes a sixth chamber, the sixth chamber being of greater height than the at least five chambers, and the sixth chamber also having an insertion slot, and the motivational savings bank set additionally includes a plurality of special awards for insertion into the insertion slot of the sixth chamber; each of the six chambers is provided with indicia thereon, the indicia indicating ascending levels of achievement corresponding to the ascending vertical heights of the chambers; the imitation money of ascending denominations includes a second series of imitation bills of ascending denominations, and the motivational savings bank set additionally includes a tally sheet for maintaining a tally of awards of the imitation money.

In yet another aspect, the invention generally features a motivational savings bank set, the motivational savings bank set including: a savings bank, the savings bank including: at least six separate and discrete chambers; the at least six chambers being of sequential, ordered, and ascending vertical heights; the at least six chambers being arranged substantially in a row, the chambers being ordered in the row according to their ascending heights; each of the at least six chambers having indicia provided thereon, the indicia provided on the chambers indicating six sequential, ordered, and ascending levels of achievement corresponding to the heights of the chambers; the five tallest of the six chambers having an associated insertion slot and the shortest of the six chambers lacking an insertion slot; imitation money of ascending denominations including: a series of imitation bills of ascending denominations; and a series of imitation coins of ascending denominations; a plurality of special awards for insertion into the insertion slot of the sixth chamber; and a tally sheet for maintaining a tally of awards of the imitation money.

One object of the present invention is the provision of a savings bank, along with accompanying materials (e.g., imitation money, etc.), that can be used to motivate children by rewarding them for various levels of achievement.

Another object of the invention is the provision of a savings bank set that can be used most particularly to reward children for levels of achievement in school.

A further object of the invention is the provision of a savings bank set that is adaptable in that the levels of reward can be easily adjusted depending upon the wishes of the parent.

A still further object of the invention is the provision of a savings bank set wherein token rewards are utilized that can be exchanged for currency at a later date.

The invention will now be described by way of a particularly preferred embodiment, reference being made to the accompanying drawings, wherein:

BRIEF DESCRIPTION OF THE DRAWINGS

FIG. 8 is an illustration of a tally sheet designed to be used in conjunction with the savings bank.

DESCRIPTION OF THE PREFERRED EMBODIMENT

Figure 1:
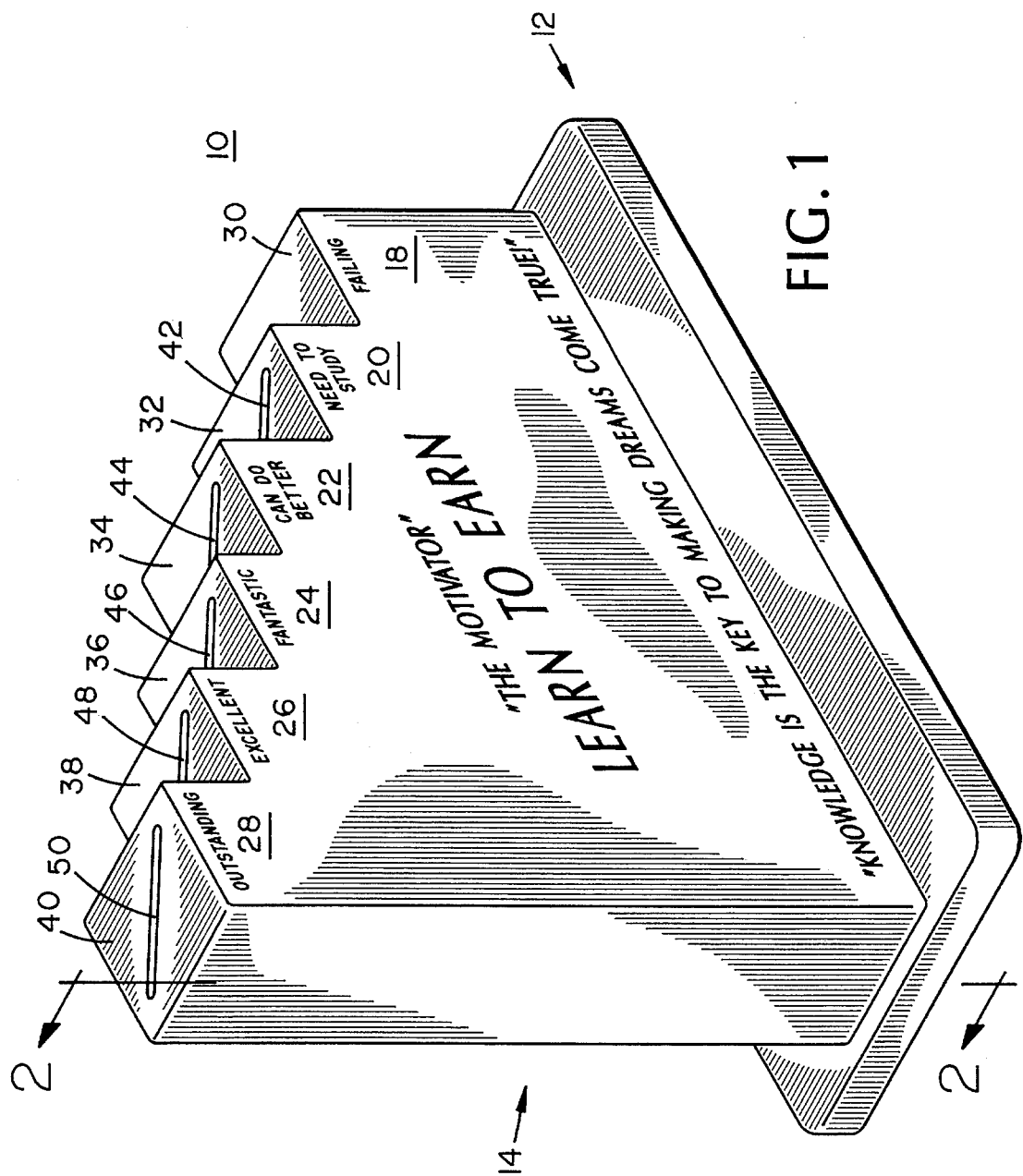
FIG. 1 is a perspective view of a savings bank constructed according to the invention.
Figure 2:
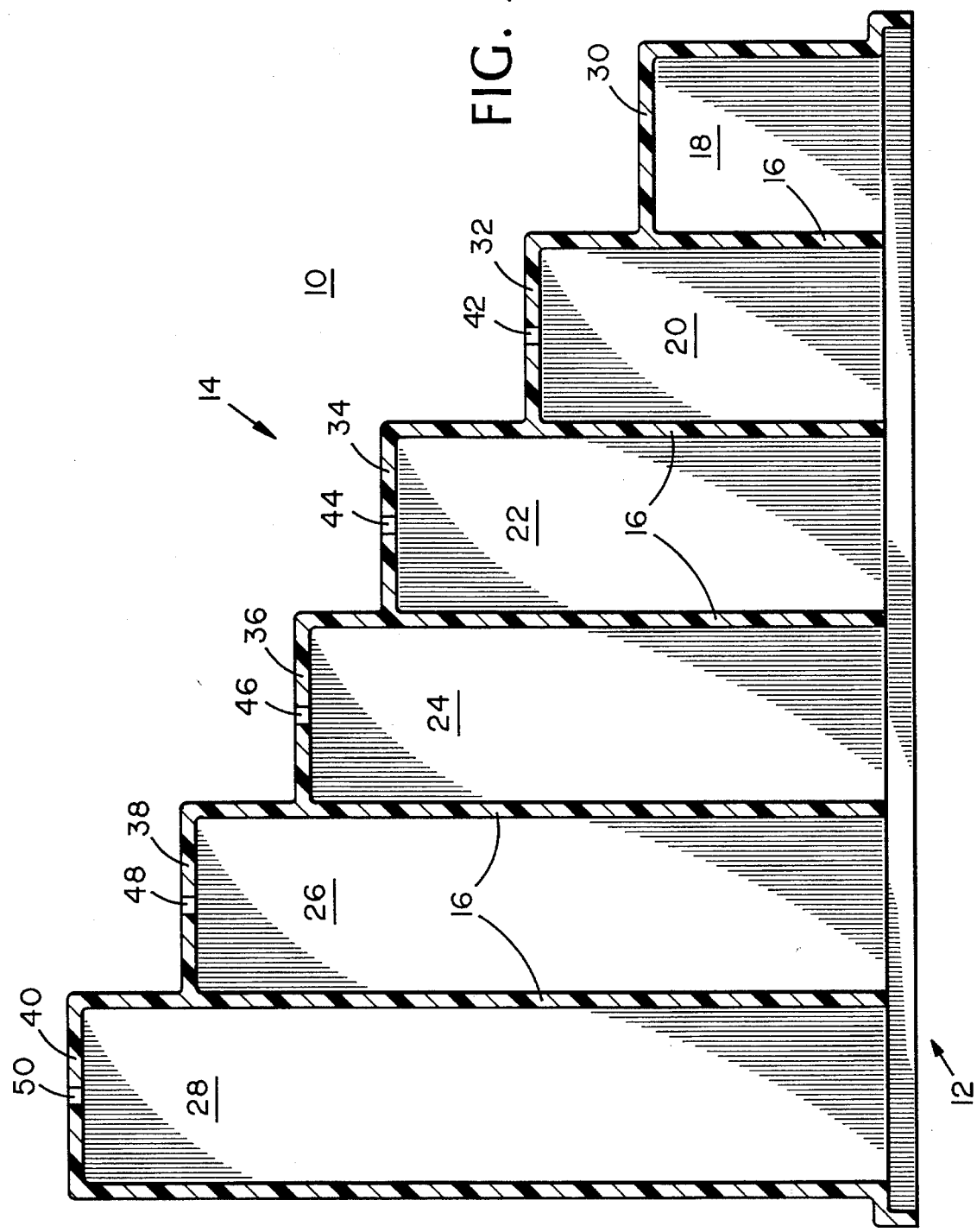
FIG. 2 is a cross sectional view through the savings bank, along the lines shown in FIG. 1.
Figure 3:
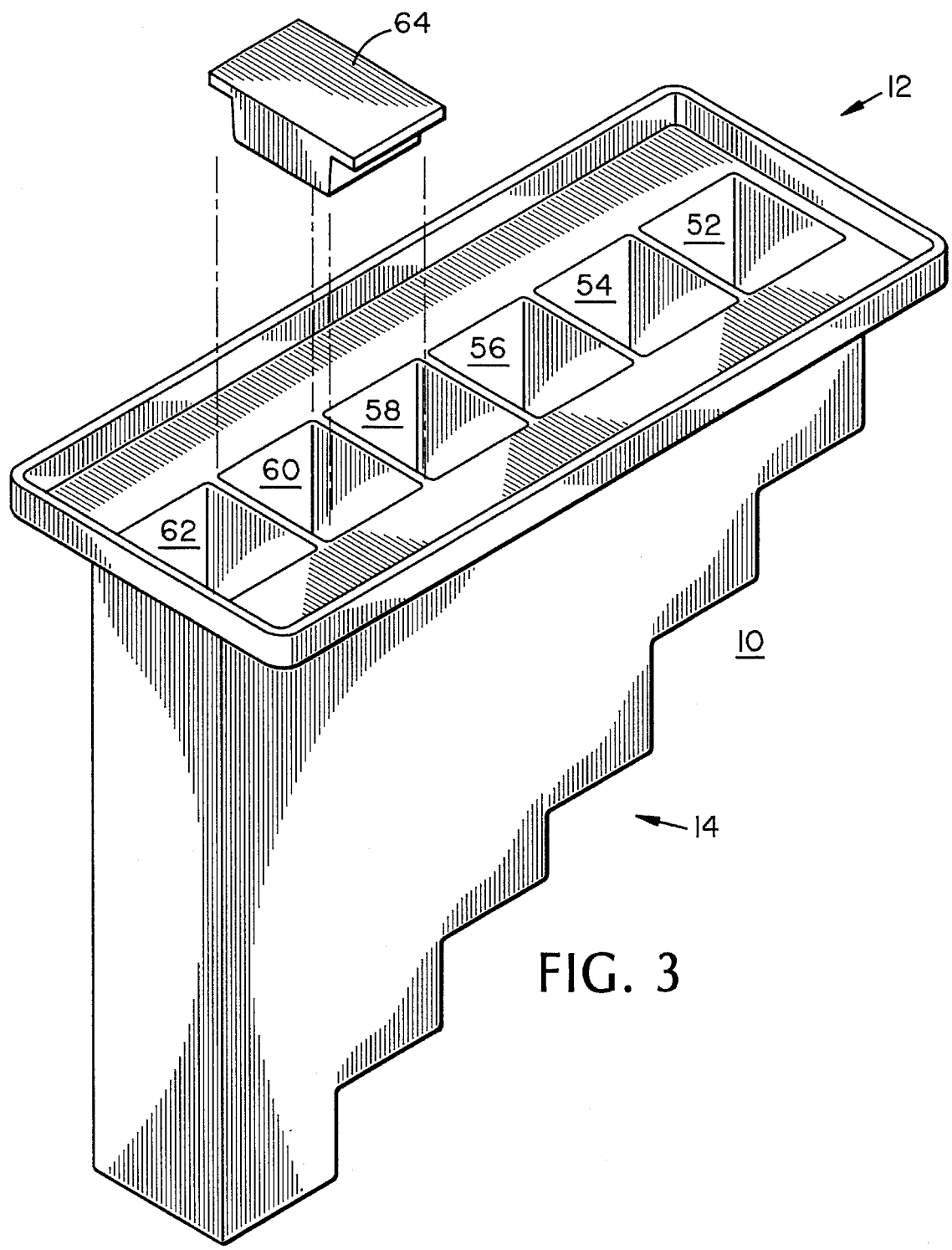
FIG. 3 is another perspective view of the savings bank, here shown inverted.

Referring now most particularly to FIGS. 1–3, a savings bank set constructed according to the present invention generally includes a savings bank 10 that is preferably unitarily formed from a plastic material and includes a generally horizontal base portion 12 and a generally vertical container portion 14 upstanding therefrom. As seen most clearly in FIG. 2, the container portion 14 is internally divided into a number of interior chambers by a plurality of interior walls 16. Preferably, at least five such chambers are provided, and even more preferably, six. Thus, six internal chambers 18, 20, 22, 24, 26, and 28 are shown in FIGS. 1–3.

Each of the six chambers 18, 20, 22, 24, 26, and 28 is of a distinctly different vertical height than the remainder of the chambers and has a top surface 30, 32, 34, 36, 38, and 40, respectively. The chambers 18, 20, 22, 24, 26, and 28 are preferably arranged substantially in a row according to their vertical heights, and the top surfaces 30, 32, 34, 36, 38, and 40 therefore, form an ascending staircase pattern. Additionally, each of the chambers, with the exception of the shortest chamber 18, is provided with an associated coin insertion slot 42, 44, 46, 48, and 50, respectively, on the top surfaces 32, 34, 36, 38, and 40 thereof.

As seen most clearly in FIG. 1, each of the plurality of chambers 18, 20, 22, 24, 26, and 28 is provided, on an outside surface thereof, with indicia that indicates a particular level of achievement. Thus, in the preferred embodiment, the ascending descriptive terms of "Failing", "Need To Study", "Can Do Better", "Fantastic", "Excellent", and "Outstanding" are visibly associated with the chambers 18, 20, 22, 24, 26, and 28, respectively.

Additionally, as shown in FIG. 3, each of the six chambers is provided with an access opening located on the underside of the base member 12. Thus access openings 52, 54, 56, 58, 60, and 62 permit access to the chambers 18, 20, 22, 24, 26, and 28, respectively. The access opening 52 is not strictly required for access to the shortest chamber 18, since the chamber 18 is not provided with a coin insertion slot. However, the savings bank 10 is preferably a shell that is injection molded from plastic, and the most economic approach is to mold the shortest chamber 18 as a hollow chamber having the access opening 52. Additionally, each chamber, with the exception of the shortest chamber 18, is provided with a removable stopper member 64 for closing its associated access opening. While only one stopper member 64 is shown in FIG. 3, it is to be understood that each of the access openings 54, 56, 58, 60, and 62 is furnished with a similar stopper member 64.

Figure 4:
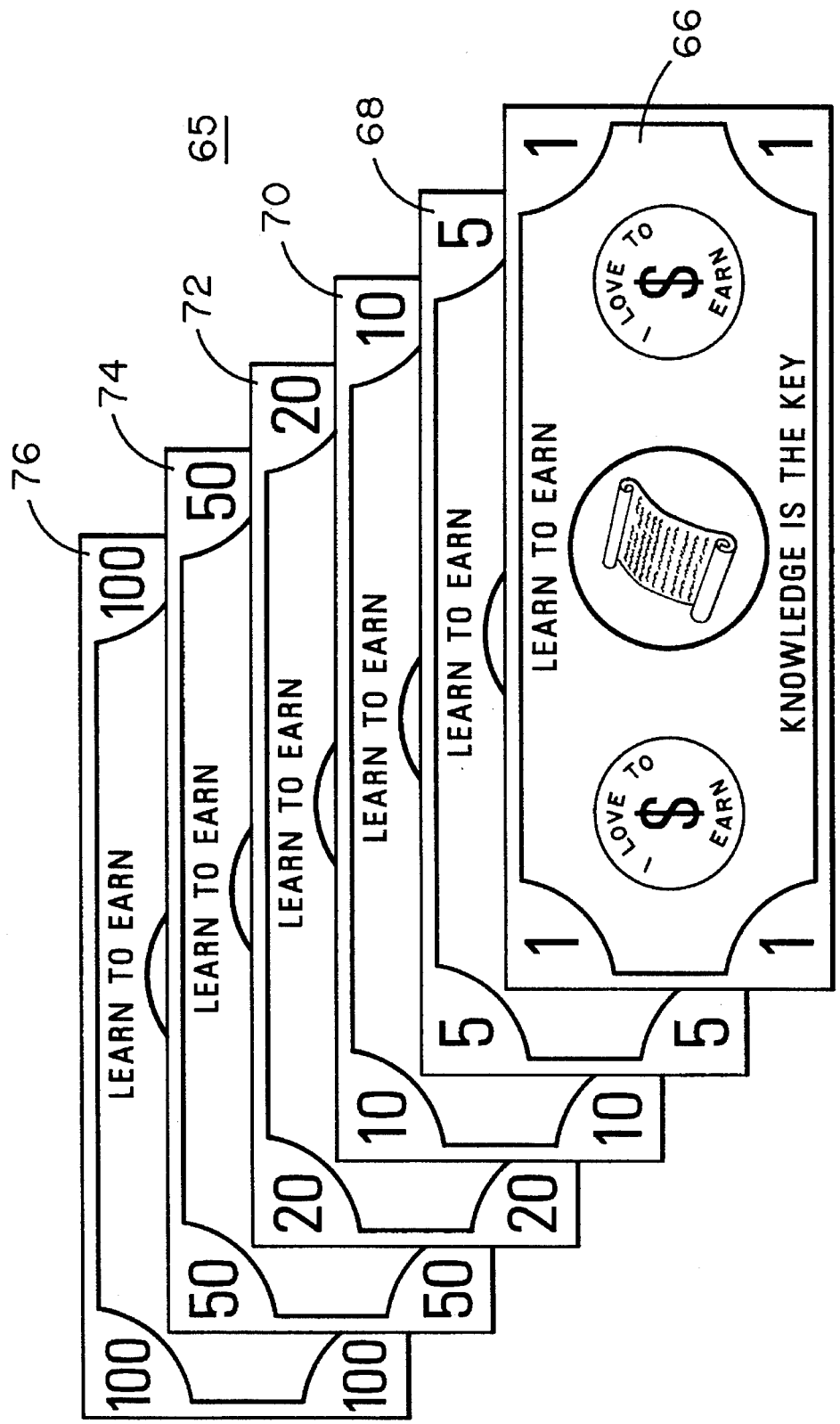
FIG. 4 is an illustration of a series of currency bills designed to be used in conjunction with the savings bank.

The savings bank set according to the invention also includes at least one series of tokens bearing thereon indicia indicating denominations. One possible series of tokens, shown in FIG. 4, comprises a series of imitation paper money bills 65, which includes bills 66, 68, 70, 72, 74, and 76, having markings thereon indicating them as representing 1, 5, 10, 20, 50, and 100 dollar denominations, respectively. The bills 65 additionally bear other markings that imitate, in an obvious way, the look of genuine currency, and also preferably have inspirational slogans imprinted thereon, for example, the slogans "Knowledge Is The Key," "I Love To Learn," and/or "Learn To Earn."

Figure 5:
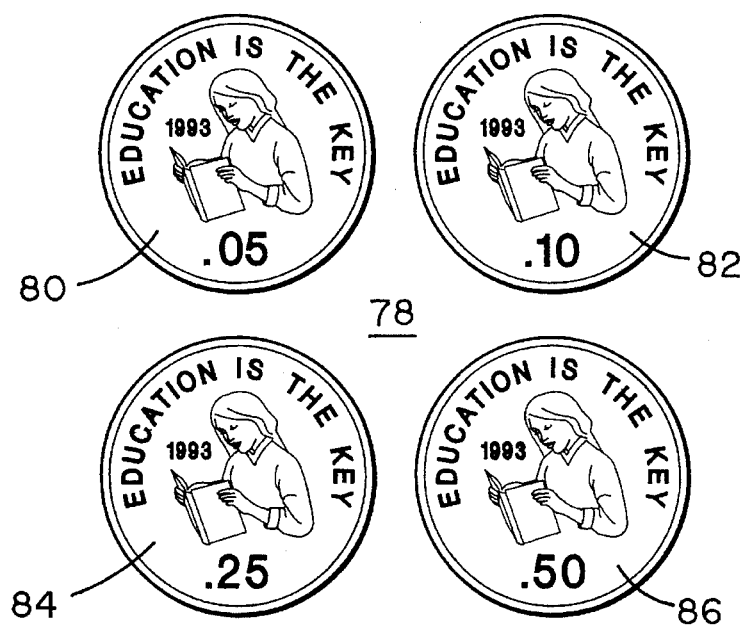
FIG. 5 is an illustration of a series of currency coins designed to be used in conjunction with the savings bank.

An additional possible series of tokens, shown in FIG. 5, comprises a series of imitation coins 78, and includes imitation coins 80, 82, 84, and 86, which are marked as representing 5, 10, 25, and 50 cent denominations, respectively, and which are also preferably imprinted with inspirational slogans, such as, for example, "Education Is The Key."

Figure 6:
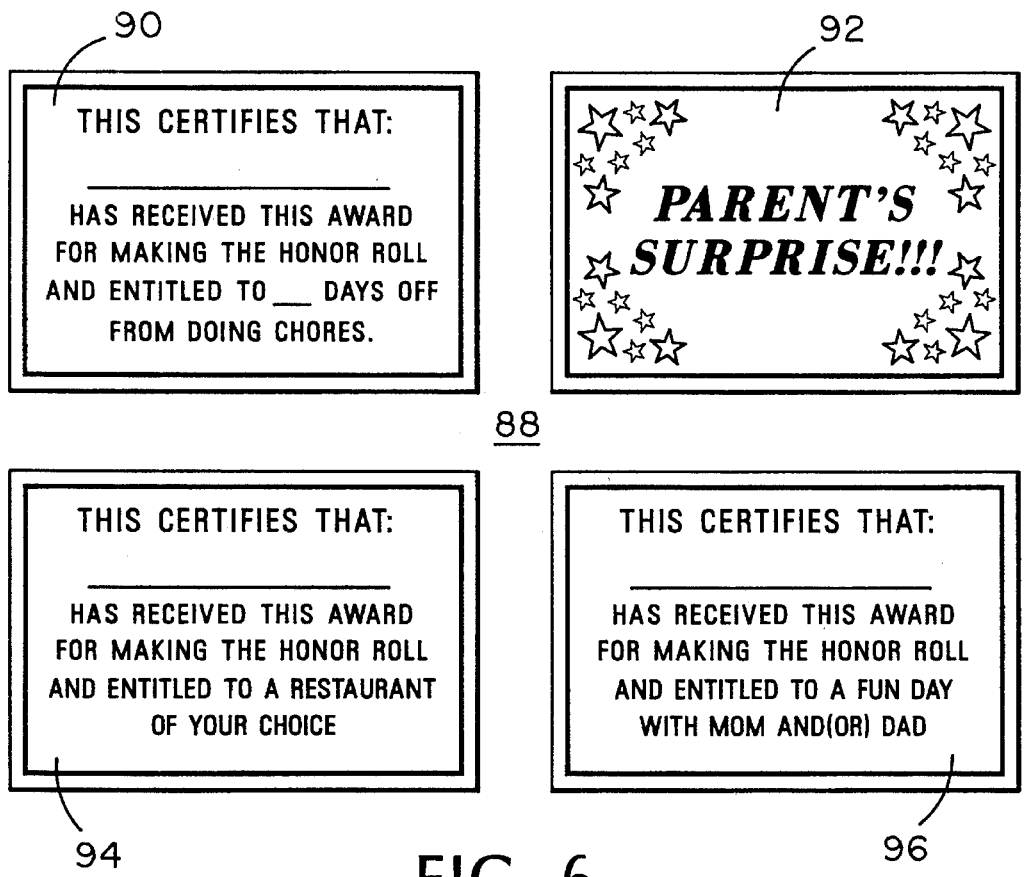
FIG. 6 is an illustration of a number of special award cards designed to be used in conjunction with the savings bank.

FIG. 6 illustrates a series of special award cards 88 that is preferably included as part of the motivational banking set. The series of special award cards 88 can include, for example, cards 90, 92, 94, and 96 that, as shown in FIG. 6, are imprinted to indicate the awarding of various special rewards. In the preferred embodiment described herein, the special award cards 88 are designated for insertion into the highest ranking chamber 28, which is preferably associated with the highest level of achievement, for example, achieving a school grade equivalent to "Honor Roll." The rewards represented by the various special award cards 88 are self explanatory from FIG. 6 and require no further discussion herein.

Figure 7:
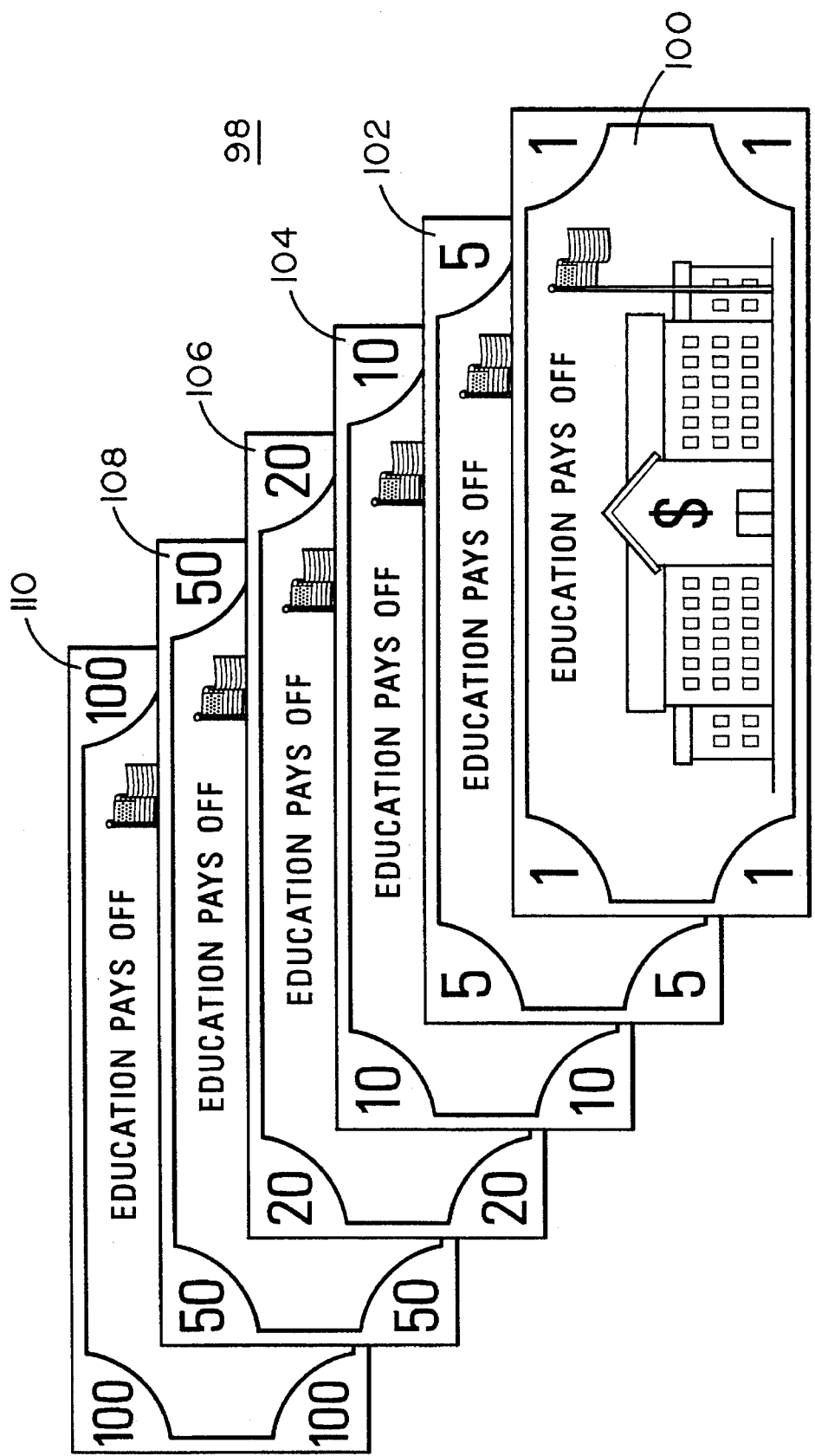
FIG. 7 is an illustration of another series of currency bills designed to be used in conjunction with the savings bank.

FIG. 7 illustrates a second series of imitation paper money bills 98 that are optionally includable within the motivational savings bank set, the second series of imitation bills 98 including bills 100, 102, 104, 106, 108, and 110, which are imprinted to indicate that they represent 1, 5, 10, 20, 50, and 100 dollar bills, respectively. The second series of imitation bills 98 is optionally provided in place of, or in addition to, the series of imitation bills 65 discussed above. The second series of imitation bills 98 is similarly preferably imprinted with an inspirational slogan, for example, "Education Pays Off."

FIG. 8 shows a tally sheet 100 that optionally forms a part of the motivational savings bank set, and which allows a parent to maintain a record of awards. The tally sheet 100 is preferably provided in the form of a pad 102 of tally sheets 100, each of which is imprinted with a column 104 entitled "Name," a column 106 entitled "Grade" (which preferably has the grades "HABCDF" preprinted therein, allowing one grade to be easily circled by the parent), a column 108 entitled "Date," and a column 110 entitled "Remarks." As shown by the data which has been filled into the tally sheet 100, this arrangement allows the parent to keep track of awards granted.

The motivational savings bank described herein is quite easy to use and is adaptable according to the wishes of the parent. The parent decides upon a particular level of reward, in dollars, to be awarded for a particular level of achievement accomplished by the child. The levels of achievement can be conveniently linked to the grades that the child receives in school. Thus, for example, the six columns can represent, in ascending order, the school grades of F (or failure), D, C, B, A, and Honor Roll. Each of these grades can be assigned a particular monetary value, and the parent rewards the child with the included token currency according to the grades received. The child then deposits the token currency in the savings bank 10. At agreed upon intervals of time, the savings bank 10 is emptied, and the token currency is exchanged for genuine currency, or for any other rewards that the parent and child may have decided.

For extraordinary achievement, for example, for making the Honor Roll, the child can be rewarded with one of the special award cards 88, to be exchanged for the reward indicated thereon at a time agreed upon.

While the invention has been herein described by way of a particular preferred embodiment, various substitutions of equivalents may be effected without departing from the spirit and scope of the invention as set forth in the following claims.

What is claimed is:

1. A motivational savings bank set, said motivational savings bank set comprising:

a savings bank, said savings bank comprising:

a plurality of separate and discrete chambers;

said plurality of chambers being of differing vertical heights;

each of said plurality of chambers having indicia provided thereon;

said indicia on said chambers indicating differing levels of achievement corresponding to said differing vertical heights of said chambers;

a plurality of tokens, each of said tokens having indicia thereon indicating a denomination;

said plurality of tokens having denominational indicia thereon comprises imitation money of ascending denominations;

said plurality of chambers are aligned substantially in a row in order of ascending height;

all but the shortest of said plurality of chambers comprises an associated insertion slot, and wherein the shortest of said plurality of chambers lacks an insertion slot;

said imitation money of ascending denominations comprises at least two separate and distinct series of imitation money of ascending denominations;

said at least two series of imitation money comprises:

a first series of imitation paper money of ascending denominations;

a series of imitation coin money of ascending denominations;

a second series of imitation paper money of ascending denomination; and said second series of imitation paper moneys being separate and distinct from said first series of imitation paper money;

said plurality of chambers comprises at least five chambers;

a plurality of special award tokens, and wherein said plurality of chambers additionally comprises a sixth chamber;

said sixth chamber being greater in height than any of said five chambers;

a container member;

said plurality of chambers being unitarily formed with said container member, wherein said plurality of chambers arranged in order of ascending height have top surfaces;

said insertion slots being located on said top surfaces of said plurality of chambers, and wherein said top surfaces of said plurality of chambers form an ascending staircase top surface of said container member;

said container member has a plurality of chamber openings provided on the bottom thereof, and wherein said motivational savings bank additionally comprises a plurality of stopper members for closing said plurality of chamber openings; and said motivational savings bank set additionally comprises tally sheet means for maintaining a record of awards of said imitation money.

2. A motivational savings bank set, said motivational savings bank set comprising:

a savings bank, said savings bank comprising:

at least five separate and discrete chambers;

said at least five chambers being of sequential, ordered, and ascending vertical heights;

each of said at least five chambers having indicia provided thereon, said indicia on said chambers indicating five sequential, ordered, and ascending levels of achievement corresponding to the sequential, ordered, and ascending vertical heights of said at least five chambers;

the four tallest of said at least five chambers having an associated insertion slot and the shortest of said five chambers lacking an insertion slot;

a plurality of tokens;

each of said tokens bearing indicia thereon indicating a denomination;

said indicia on said plurality of tokens being of ascending denominations;

said at least five chambers are arranged substantially in a row;

said chambers being ordered in said row according to their ascending vertical heights; and said plurality of tokens bearing indicia of ascending denominations comprises imitation money of ascending denominations;

said imitation money of ascending denominations comprising:

a series of imitation bills of ascending denominations; and a series of imitation coins of ascending denominations;

said savings bank additionally comprises a sixth chamber;

said sixth chamber being of greater height than said at least five chambers; and said sixth chamber also having an insertion slot; and said motivational savings bank set additionally comprises a plurality of special awards for insertion into said insertion slot of said sixth chamber;

each of said six chambers is provided with indicia thereon, said indicia indicating ascending levels of achievement corresponding to said ascending vertical heights of said chambers;

said imitation money of ascending denominations comprises a second series of imitation bills of ascending denominations; and said motivational savings bank set additionally comprises tally means for maintaining a tally of awards of said imitation money.

* * * * *